(12) United States Patent
Melnyk et al.

(10) Patent No.: US 6,965,720 B2
(45) Date of Patent: Nov. 15, 2005

(54) FIBER OPTIC APPARATUS FOR SWITCHING ELECTRICAL LOADS

(76) Inventors: Ivan Melnyk, 604 Cottonwood Ave, Coquitlam (CA), V3j 2S4; Ivan Tochev, 303-4170 Nanaimo Str., Vancouver (CA), V5H 5H7

( * ) Notice: Subject to any disclaimer, the term of this patent is extended or adjusted under 35 U.S.C. 154(b) by 450 days.

(21) Appl. No.: 10/245,694

(22) Filed: Sep. 18, 2002

(65) Prior Publication Data

US 2004/0052492 A1 Mar. 18, 2004

(51) Int. Cl.[7] ............................................... G02B 6/00
(52) U.S. Cl. ...................................... 385/134; 385/135
(58) Field of Search ................................ 385/134, 135, 385/137, 139

(56) References Cited

U.S. PATENT DOCUMENTS

| | | | | |
|---|---|---|---|---|
| 3,999,074 A | * | 12/1976 | Callaghan | 250/551 |
| 4,705,348 A | * | 11/1987 | Matsunaga et al. | 385/18 |
| 5,239,599 A | * | 8/1993 | Harman | 385/16 |
| 5,247,603 A | * | 9/1993 | Vidacovich et al. | 385/135 |
| 5,434,756 A | * | 7/1995 | Hsu et al. | 362/552 |
| 5,570,437 A | * | 10/1996 | Kluth et al. | 385/12 |
| 5,594,820 A | * | 1/1997 | Garel-Jones et al. | 385/22 |
| 6,208,797 B1 | * | 3/2001 | Vanderhoof et al. | 385/135 |

\* cited by examiner

Primary Examiner—Daniel St Cyr (57) ABSTRACT

A fiber optic switching apparatus for switching electrical loads is comprised of a switching box, an optical cable, and an electronic adapter. The switching box consists of an internal housing attached to the front panel of an external housing, and an actuator and a fitting for holding the optical cable. The internal housing consists of an optical switching module that includes a fiber aligning unit and a shutter with filtering means; the filtering means can slide in a narrow gap in the fiber alignment unit which has illuminating and detecting fibers; the shutter is mechanically connected to the actuator. The fibers are terminated in a fiber optic connector that is located outside the internal housing. The electronic adapter consists of a light illuminating and a light detecting means which are operated by a microcontroller providing output to a switching means that switches electrical loads.

15 Claims, 8 Drawing Sheets

| B | G | Y | B | G | Y | B | G | Y | Filter in optical path | |
|---|---|---|---|---|---|---|---|---|---|---|
| 1 | 2 | 3 | 4 | 5 | 6 | 7 | 8 | 9 | Position of switch or signal level | |

FIBER OPTIC APPARATUS FOR SWITCHING ELECTRICAL LOADS

This invention relates to electrical switching technology. More precisely, the invention relates to electrical switching systems to be used in hazardous industrial applications.

Fibre optic switches allow switching of electrical loads from locations where traditional electrical switches can create the risk of sparks and electrical shorts. This includes a wide area of hazardous and potentially explosive applications found in the chemical, petrochemical, gas, and oil industries. As well, fibre optics are not affected by wet conditions, thus providing an excellent opportunity for electrical switching in marine fields.

A number of fibre optic switches for switching electrical loads have already been proposed. U.S. Pat. No. 3,999,074 discloses a fibre optic power control device for switching the electrical load at a distance from the load. The device consists of a light generating means coupled to an illuminating optical fibre, a light detecting means coupled to detecting optical fibres, an amplifier, and an electronic switch. The intensity of the light coming to the detecting fibre can be changed by changing the orientation between the illuminating and detecting fibres or by rotating filters between them (including polarizing filters). This design, however, does not describe the details about how such an optical switch can be applied to replace regular rotary, toggle, or sliding electrical switches. In addition, moving fibres require precise mechanical alignments that may be not cost effective.

U.S. Pat. No. 5,721,794 discloses a fibre optic switch for the automotive industry, particularly to be used in an automobile door. The switch is comprised of a pair of optical interrupters, a shutter, and a switch knob. When activated by the knob, the shutter blocks or opens the path for light going through the interrupters so the simple logic can recognize the status of the switch and send corresponding electrical signals to relays that switch the electrical load. The switch, however, is not practical for wide industrial applications because the assembly of fibre optic interrupters requires careful and precise alignment of the fibres. Usually such conditions cannot be achieved in industrial environments where electrical switches may be installed under temperatures ranging from −40C to +50C without any special support such as desks and optical alignment tools such as magnifying glasses or microscopes. Further, the switch above has a limited number of functions, either "ON" or "OFF", thus multiposition switching is not achievable in this design. In addition, this design is not suitable for the push button switches that are widely used in industry. Heavy industrial applications, such those in the oil, gas, and petrochemical industries have already developed special requirements for the housing and ergonomics of electrical switches. These requirements differ from those in the automotive industry because industrial switches are usually activated by hands protected with a heavy industrial gloves.

U.S. Pat. No. 5,410,150 discloses a push button fibre optic switch that is particularly suitable for switching electrical loads in wet environments, such as pools and spas. The switch consists of an elastic membrane with an internal reflective surface that faces a pair of optical fibres coupled to an electronic adaptor with light sources, photodetectors, and signal processing means connected to electrical loads (preferably water pumps). The switch operates as a photoelectric proximity sensor (i.e., it can change the output when the distance between the reflective surface and the optical fibres is changed). The switch, however, can only be used for shorter distances because inefficient light coupling between the illuminating and detecting optical fibres causes high light losses. Further, this design is not suitable for rotary, toggle, and sliding industrial switches that are robust and reliable. Again, the switch above is applicable with two positions only, either "ON" or "OFF"; thus, a multi-position function cannot be realized by this design.

There is, therefore, a need for fibre optic industrial switching devices that are robust and reliable and that are easy to install in harsh industrial environments. These switching devices must preferably cover all known types of electrical switches, such as rotary, toggle, and sliding switches with two positions and multiposition states. An objective of the present invention is to provide such fibre optic switching devices.

In brief, this objective is accomplished in the following ways. The design of the fibre optic switch, in accord with the present invention, includes an optical switching module that represents an illuminating fibre and detecting fibres that are coaxially aligned, and a shutter with a light filtering means. If activated with an actuator, the shutter can be slid into a small gap between the illuminating and detecting fibres. The optical switching module is enclosed in an internal housing with an optical connector for fast connection of the fibres to a fibre optic cable. The optical connector is covered by a second or external housing which carries a fitting for the mechanical connection of the fibre optic cable to the switch and an actuator that is connected to the shutter inside the internal housing. The actuator can be any actuator that has already been used and approved for electrical switches. The fibre optic cable is coupled on its second end to an electronic adaptor by using a second optical connector that is preferably identical to that in the external housing. The adaptor is preferably located in a programmable logic controller, PLC; the fibre optic cable may be mechanically attached to a PLC cabinet via a fitting that is identical to that used in the external housing.

In such a design, universality (either rotary, toggle, slide, or multiposition switch) is achieved by using regular or universal actuators that have been designed and approved for electrical switches. The robustness is achieved by protecting the fragile optical switching module with the internal housing that is assembled by the manufacturer; therefore, no optical alignment is required for installation. The switch is installed by opening a lid on the external housing, inserting the fibre optic cable through the mechanical connector and plugging the fibre optic cable to the optical connector.

These and other advantages of the present invention, such as the possibility for multiplexing and demultiplexing of the signals in order to connect a variety of switches through a single fibre optic cable, are further described in the detailed description of the invention.

DETAILED DESCRIPTION OF THE INVENTION

Figure 1:
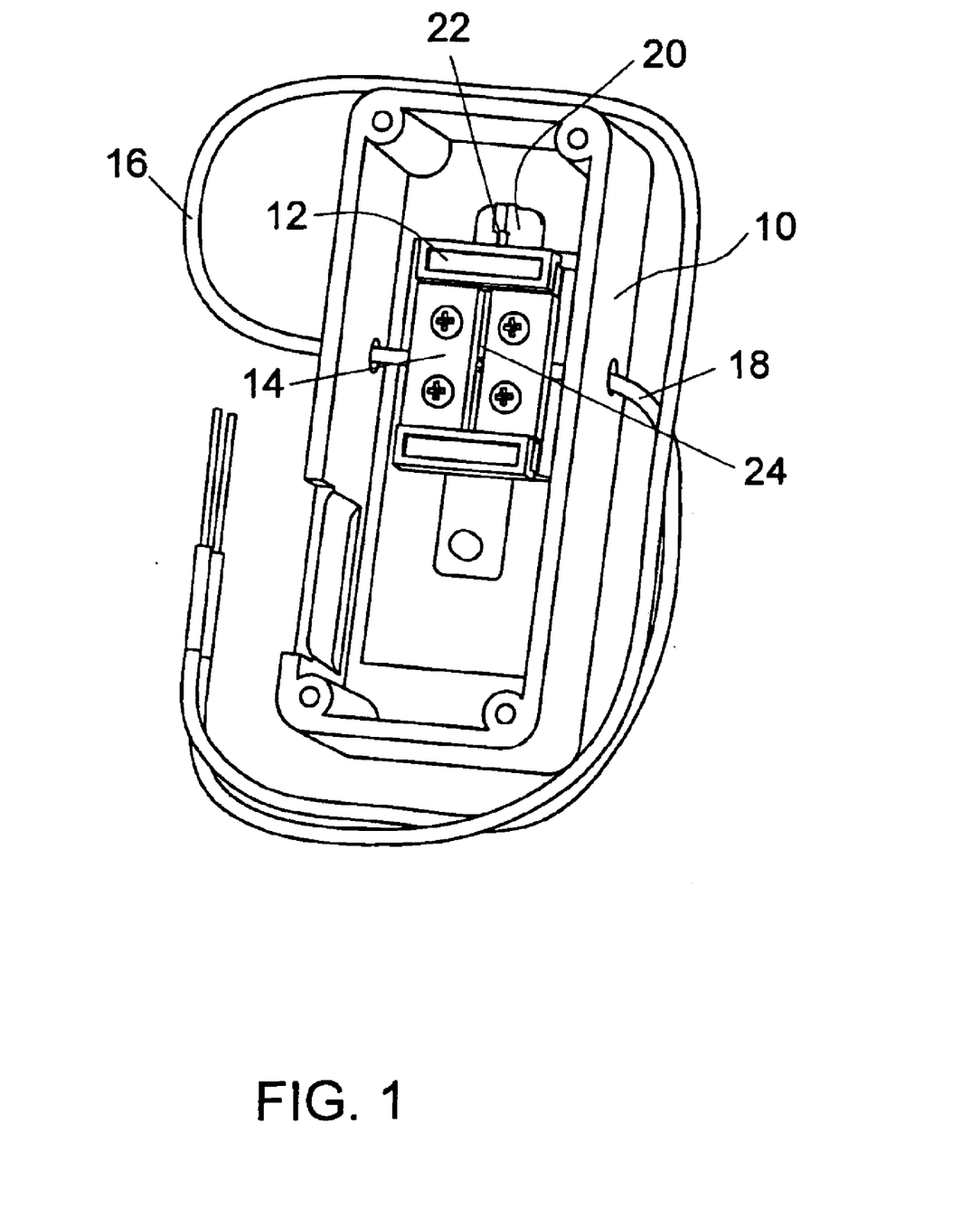
FIG. 1 shows an internal housing of a fibre optic apparatus for switching electrical loads of the invention.
Figure 2:
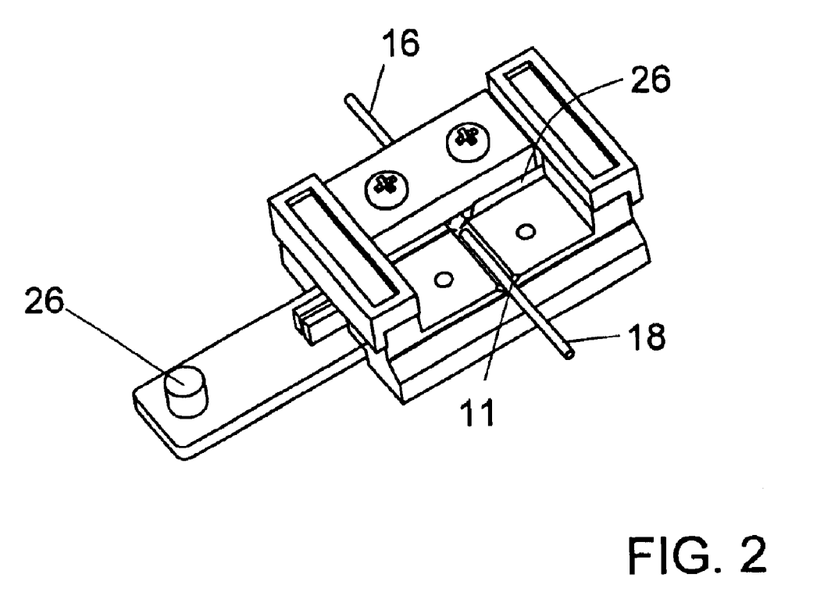
FIG. 2 presents a closer view of a fibre alignment unit of the internal housing of FIG. 1.
Figure 3:
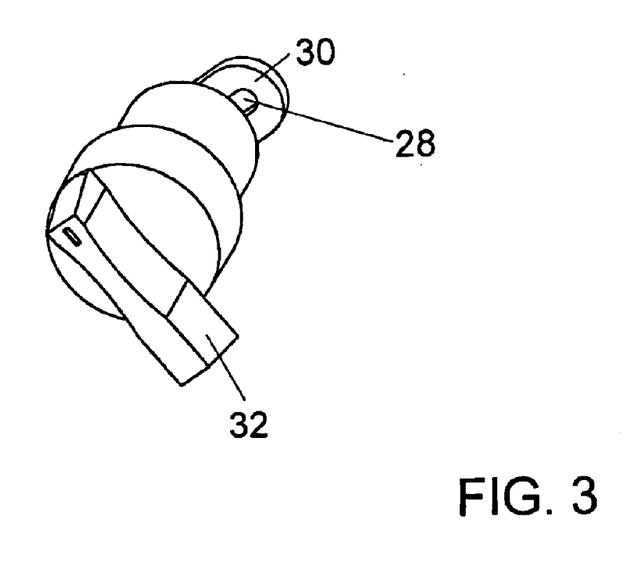
FIG. 3 is an example of the actuator (rotary handle) with a shaft for connection to the shutter of FIG. 2.
Figure 4:
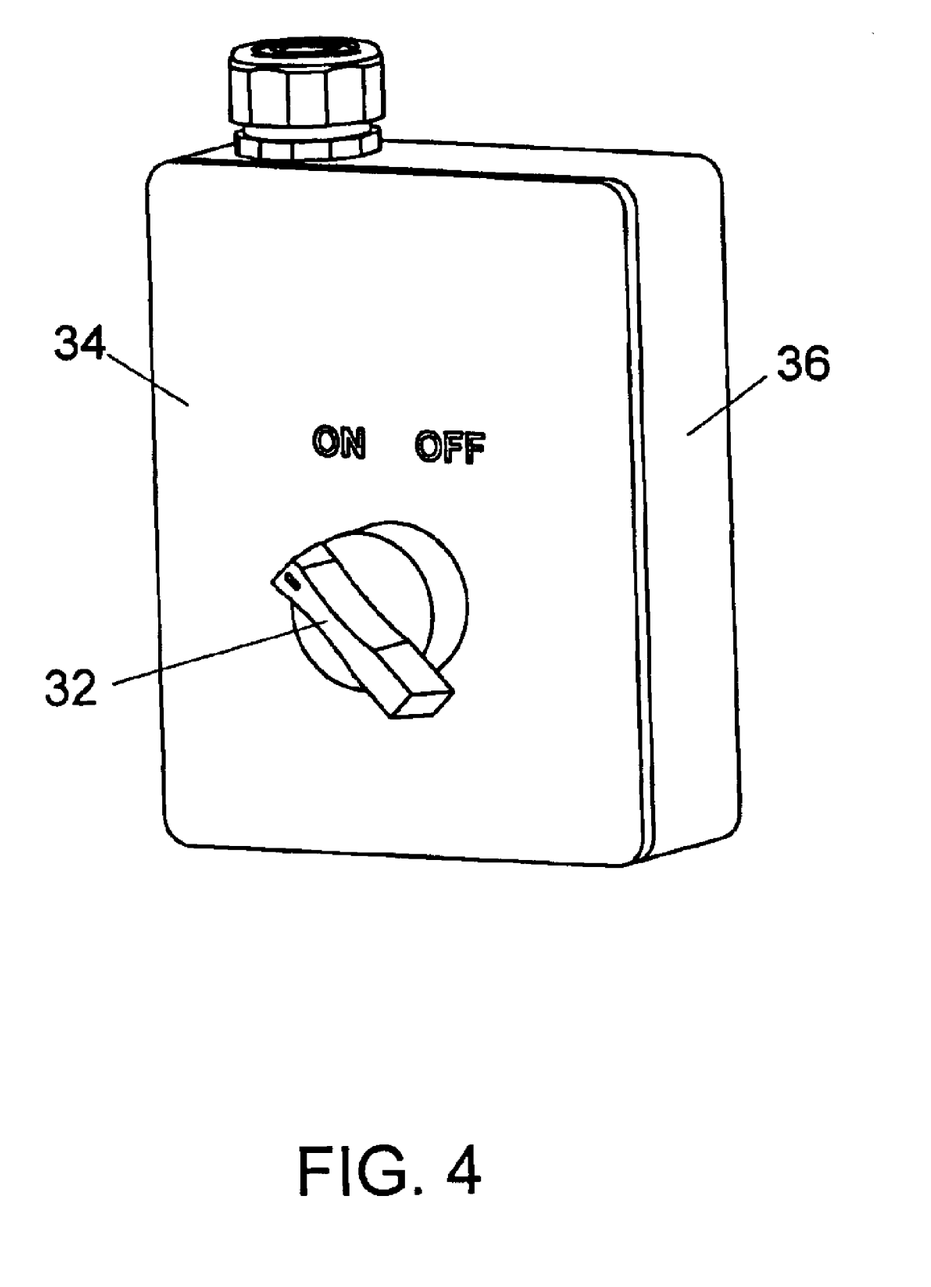
FIG. 4 is the general view of the assembled two-position toggle switch.

FIG. 1 discloses a schematic of the optical switching module according to the present invention. The module consists of a body or internal housing (10) with a fibre alignment unit (12) fixed to it. The fibre alignment unit represents a mechanical fixture with V-grooves (11) shown in FIG. 2 and clamps (14) for fixing the end of the illuminating (16) and the detecting (18) fibres. A shutter (20) carrying a filtering means (22) can be slid in the fibre aligning unit; the filtering means can slide inside a narrow gap (24) between fibre ends. A pin (26) provides a connection between the shutter and an actuator (not shown). The actuator can be a handle, a knob, a button, or any other means that is commonly use for activating the switch. In the case of the rotary switch, the pin (26) mates with an opening (28) in a shaft (30) as shown in FIG. 3; the shaft is connected to a handle (32) which is placed on a front panel or a lid (34) of an external housing (36) as shown in FIG. 4.

Figure 5:
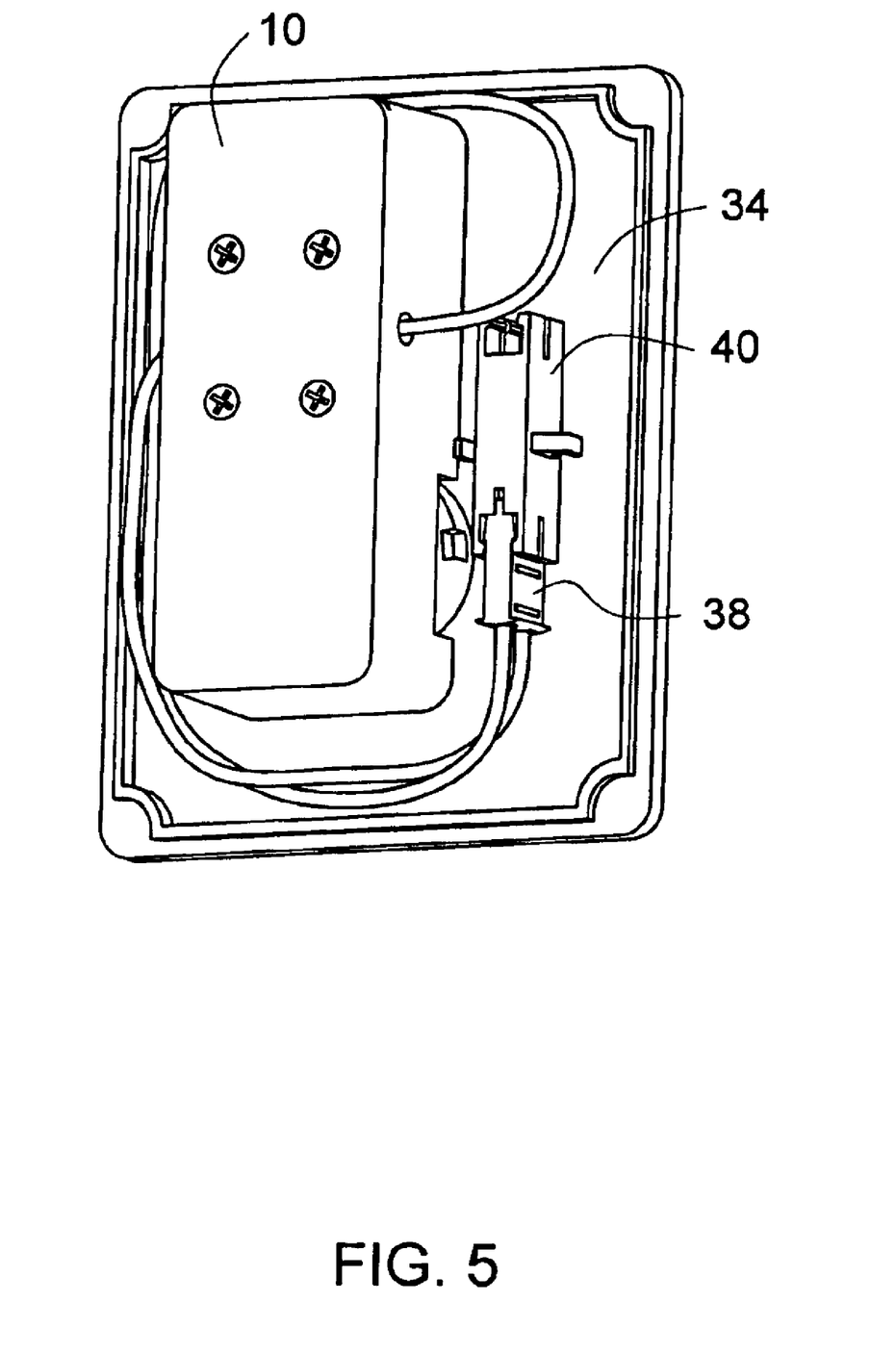
FIG. 5 is a view of the front panel of the switch of FIG. 4 with the internal housing of FIG. 1 attached to it and a fibre optic connector.

The internal housing (10) is attached to the front panel (34) as shown in FIG. 5, thus providing mechanical protection of the optical switching module. Optical fibres are terminated in a duplex plug (38) that mates with a duplex fibre optic connector (40). The fibres are preferably plastic optical fibres of 1.0 mm core diameter with a plastic jacket, such as made by Mitsubishi Rayon Co., Toray Industries, Inc., or Asahi Chemical. It is clear for those skilled in the arts that different kinds of multimode glass or plastic fibres can be used for such applications. The preference for the very common 1.0 mm plastic fibre is easy installation and termination. Preferably, the duplex plug (38) is a dual position plug assembly made by AMP/Tyco International Ltd. The duplex connector (40) that mates with the plug (38) is a dual position bulkhead receptacle made by AMP/Tyco International Ltd. The filtering means can be a simple, thin non-transparent strip with a slit in it, allowing the light to pass from the illuminating to the detecting fibre or blocking all the light if the slit is removed from the optical path. For a multi-position rotary switch or a sliding (dimmer) switch, the filtering means preferably consists of a plurality of thin narrow-band optical filters that select a certain monochromatic component of the light. The fibre ends are in close proximity to each other to provide minimum light losses, the typical width of the gap for sliding the filtering means is about 0.5 mm if plastic fibres of 1.0 mm diameters are used; the distance would be shorter for smaller fibres.

Figure 6:
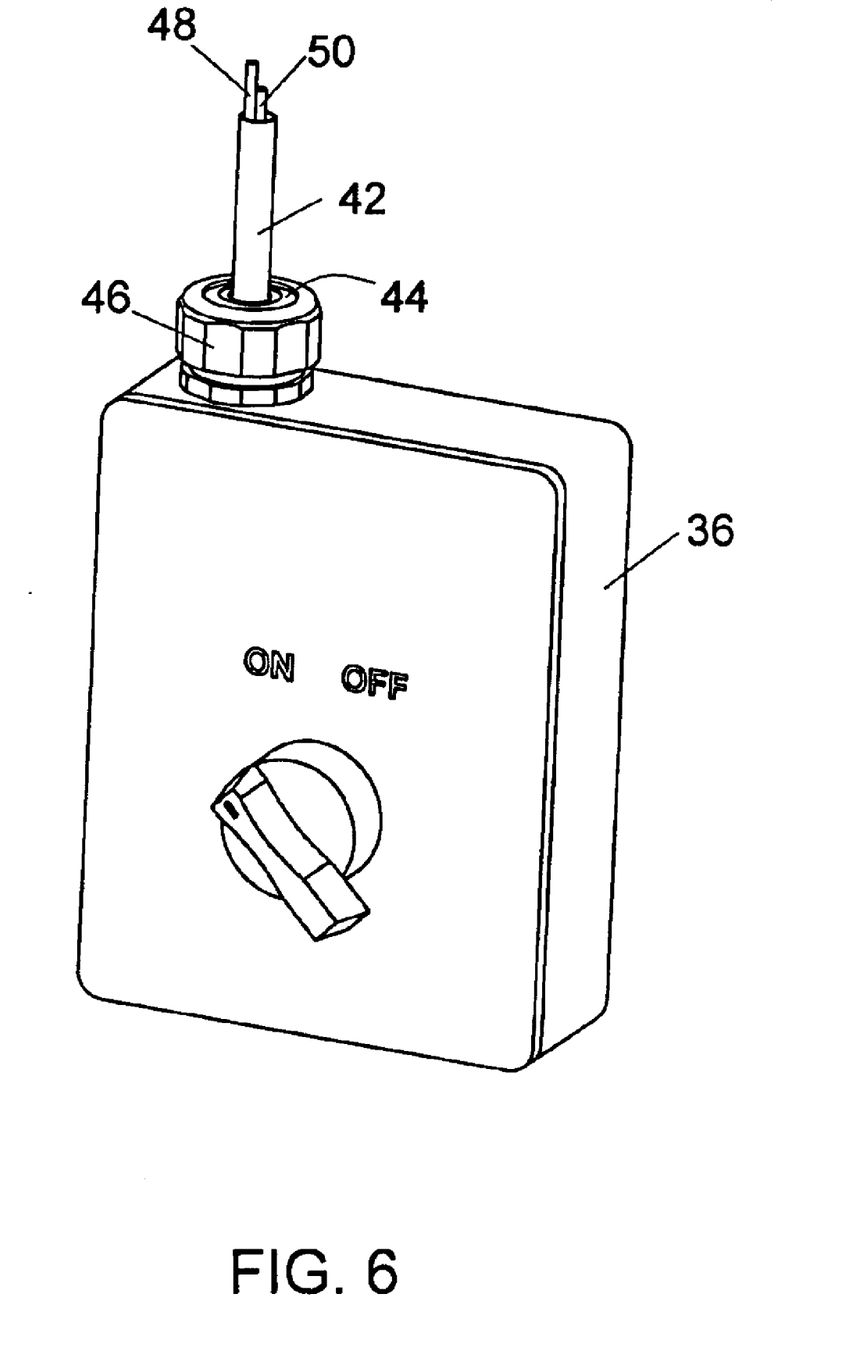
FIG. 6 is the general view of the switch of FIG. 4 with an optical cable inserted into the fitting.

Industrial environments require thorough protection of the fibres; typically this is achieved by placing fibres into a flexible metal or plastic conduit and creating in such a way a fibre optic cable. The external housing (36) of the switch, according to the present invention, serves also for mechanical connection of the fibre optic cable to the switch. This is accomplished by the insertion of a cable (42) into a fitting (44) as shown in FIG. 6. The cable is fixed in the fitting by a nut (46); optical fibres (48) and (50) inside the external housing are terminated in the same way as the fibres (16) and (18) shown in FIG. 5, namely, by a duplex plug that is identical to plug (38). This termination is provided during installation of the switch in the field. The external enclosure with the actuator and fitting represents a switching box.

Figure 7:
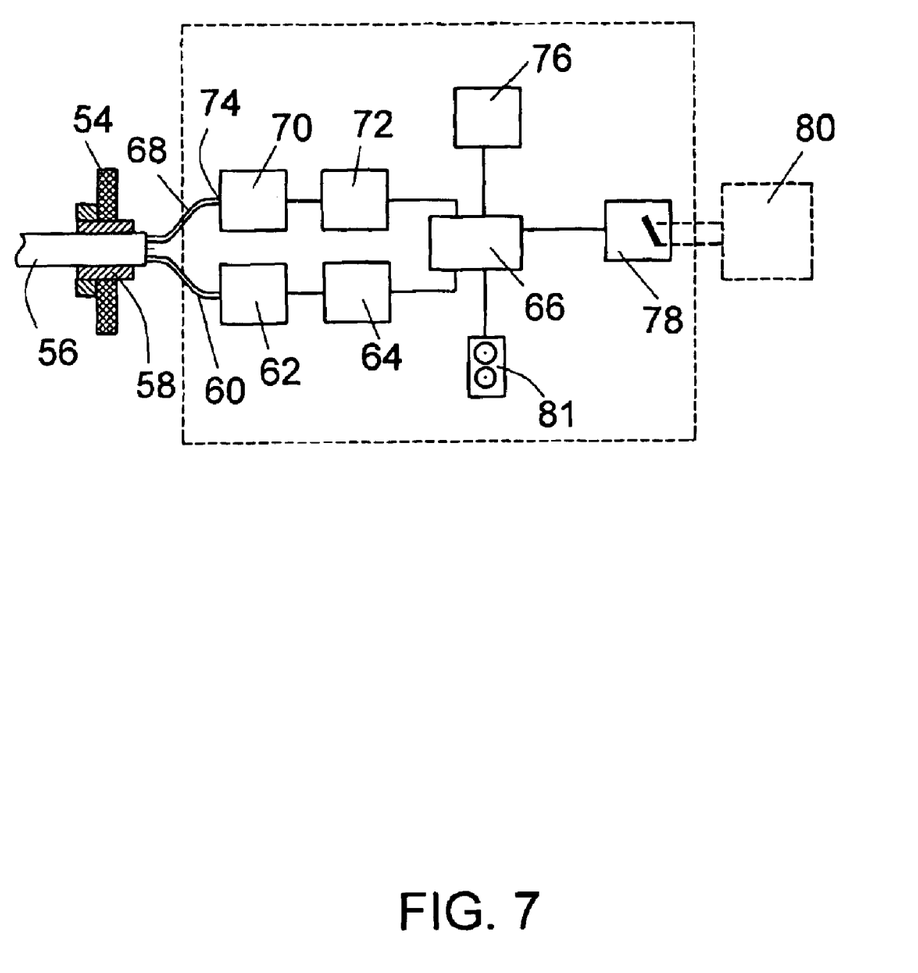
FIG. 7 is the schematic of the electronic adapter.

The opposite end of the optical cable is connected to an electronic adapter (52) preferably located in the PLC cabinet; that part of the PLC cabinet wall (54) is shown in FIG. 7. The cable end (56) is preferably fixed by using the same fitting (58) identical to that used at the switch side. The illuminating fiber (60) is coupled to an illuminating unit (62) which is connected through a driver (64) to a microcontroller (66). The detecting fiber (68) is coupled to a photodetecting unit (70) with an amplification means (72) connected to the microcontroller (66). The illuminating unit consists of a single light source or a plurality of light sources, depending on the number of positions the switch can operate at. Light sources are preferably light emitting diodes (LEDs), more preferably blue, green and/or yellow LEDs if plastic fibres are used; this choice is made because conventional plastic fibres have the highest transmission in the blue-yellow region of the visible spectrum. The photodetecting unit preferably consists of silicon photodiodes. A light filtering means (74) may be installed in front of the photodiodes providing spectral selection of the incoming light, the spectral transmission of filters corresponds to the spectral transmission of filtering means (22) in the shutter of the switch. The electronic adapter is powered from a power source (76) which is typically +24DC commonly used in industrial control; however, different power sources can be used to run the circuit. The microcontroller (66) is connected (directly or through the driver) to an electrical switching unit (78) that electrically connects and disconnects the load (80). This switching unit can include electrical relays, triggers, or other switching electrical means. The status of the switch is displayed by an indicator (81) showing "ON", "OFF", "HAND", "AUTO" or other indications. The switching unit (78) can be replaced by an electrical circuit that provides a bus connection of a number of switches using, for example, the ModBus or the Hart protocol commonly employed in up-to-date industrial instrumentation. Preferably, the microcontroller provides auto regulation of the output signals from the photodetecting unit by active adjustment of the gain of the amplification means or/and by changing the current through the LEDs. The auto regulation compensates for the dependence of the signal level upon the length of the fibre, thus preventing cases when a few photodetectors may have signal that corresponds to the "ON" status of the switch. This situation can take place for shorter lengths of optical cable due to spectral overlapping of the filters.

Figure 8:
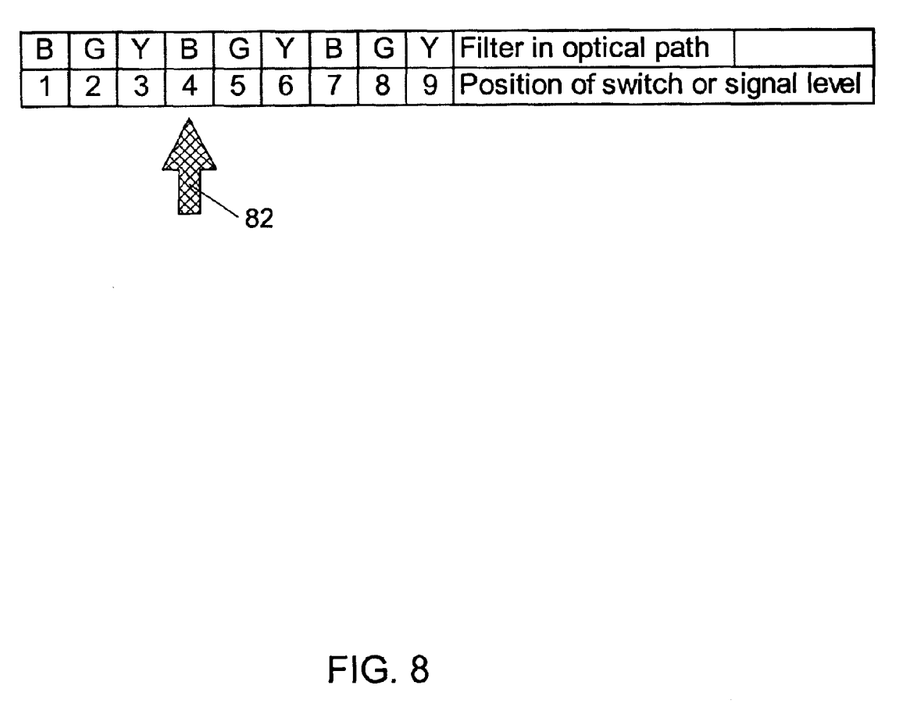
FIG. 8 is an example of a combination of filters for identification of multiple positions of the switch.

A slide switch, or dimmer is realized by connecting a linearly moving handle to the pin (26) (see FIG. 1) and by using a plurality of filters or a linear neutral density filter in the shutter (20). If the linear neutral density filter is used, the microcontroller determines the level of signal at the output of the photodetecting unit (70) and generates the control signal to the switching unit which proportionally varies the current in the circuit for the electrical load (80). FIG. 8 shows an example of the combination of three optical filters (B, G, Y are blue, green, and yellow, respectively) for achieving multiposition switching (nine positions). For instance, if the handle (82) is in position "4" which means that filter B is in the optical path of the optical switching module, then moving the handle to position "3" or "5" will cause the selection of yellow or green light, respectively. The yellow color corresponds to position "3" whereas green color corresponds to position "5" of the switch. Colors are determined by the microcontroller which compares signals from photodetectors; the microcontroller will determine exactly the selected filter by using a simple logic. Therefore, a combination of three filters allows the building of a multiposition fibre optic switch by using two fibres only. The optical switching module can work in reflective mode by using a single fibre only. However, problems associated with backscattering light eliminate the advantage of a single-fibre design and make the working distance too short for industrial applications.

Figure 9A:
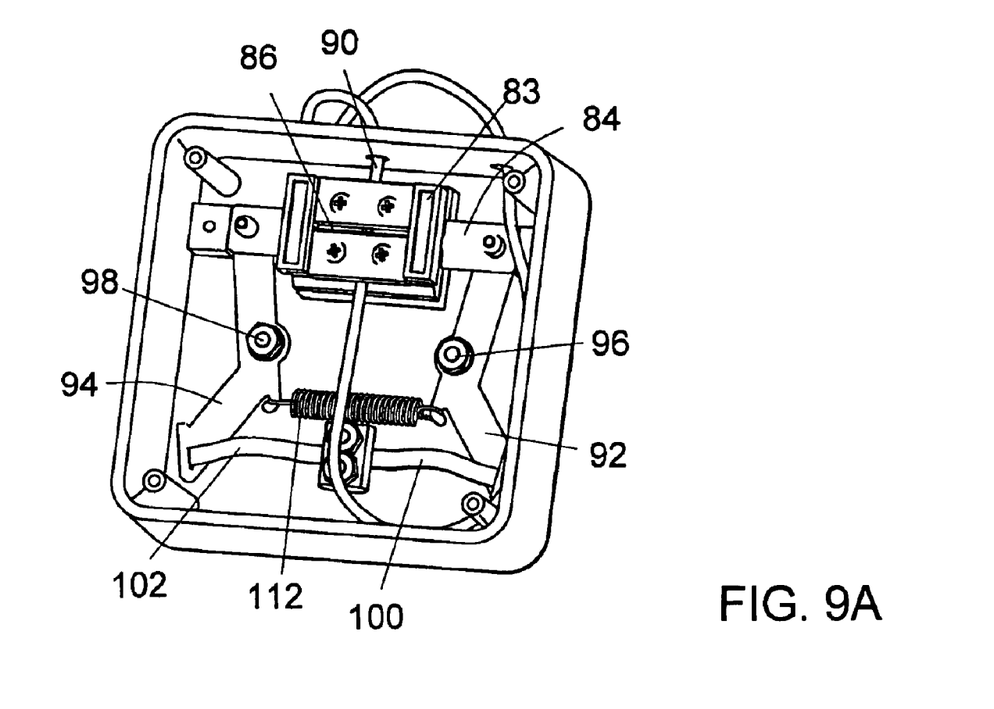
FIG. 9A represents an internal housing with the switching module as for FIG. 1 for a two-button fibre optic switch.
Figure 9B:
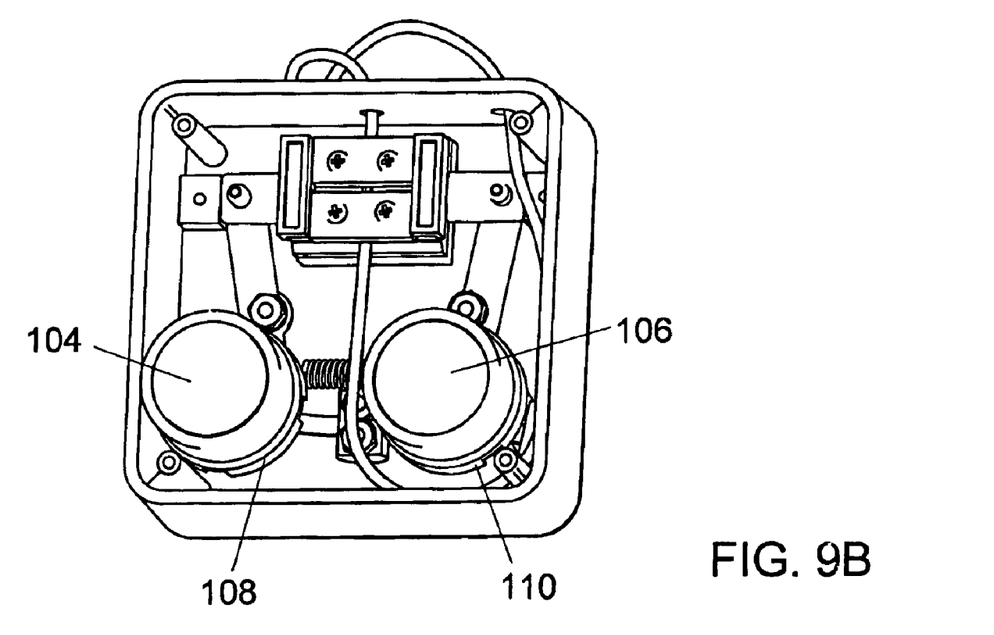
FIG. 9B is the same view as FIG. 9A with buttons added.

FIG. 9A discloses an example of the optical switching module for a two button fibre optic switch according to the present invention. The optical switching unit is comprised of a fibre alignment unit (83) which is generic for the patented switch family, and a generic shutter (84) with a filtering means that can slide inside a narrow gap (86) between the illuminating (88) and the detecting (90) fibres. Sliding of the shutter is provided by levers (92) and (94) that are rotated around axes (96) and (98), respectively, when flexible strips (100) or (102) are deformed by the depressed button. The buttons (104) and (106) are shown in FIG. 9B; they are fixed to the front panel of the switch in the same way as the handle (32) is fixed, preferably by screwing the nuts (108) and (110). A spring (112) provides the necessary tactile resistance for depressing the buttons and also keeps the shutter in the middle position if none of the buttons are depressed.

Placing the fibre optic arrangement in a separate internal housing allows for the protection of sensitive and fragile components from being damaged during installation and maintenance of the switches. Also, it enables the design of a series of switches using a universal optical switching module, including multiposition and push button switches. The external housing provides protection for a fibre optic connector that connects the optical switching module and the optical cable as well as provideing a strong mechanical connection of the switch with the optical cable. All these features provide a robust design for the fibre optic switches required in harsh industrial environments. Also, such a design allows convenient installation of the switch in the field because sensitive and fragile parts are preterminated by the manufacturer and are not exposed during the installation. The installation procedure includes the following steps:

preparing the fibre optic cable; cutting the flexible conduit, stripping the jacket from fibres, cleaning (polishing the fibre ends); insertion of fibre ends into a fibre optic plug;

opening the front panel of the external enclosure of the switching box;

mounting the external enclosure to the wall or construction where the switch will be located;

insertion of the optical cable into the fitting in the external enclosure;

insertion of the fibre optic plug into a fibre optic receptacle;

closing the front panel and tightening the fitting.

What is claimed is:

1. A fiber optic apparatus for switching electrical loads comprised of:

a switching box;

an electronic adaptor;

a fiber optic cable connecting said switching box to said electronic adaptor;

said switching box consists of:

an external enclosure with a hand-activated actuator on a front panel and a fitting for mechanical connection of said fiber optic cable to said external enclosure;

an internal enclosure mount to a front panel of said external enclosure, and having an optical switching module and an optical connector, said optical switching module consists of a fiber aligning unit, a movable shutter with a filtering means attached to the fiber aligning unit; said shutter is mechanically connected to said hand-activated actuator; said filtering means can move aside a narrow gap in said fiber aligning unit; said fiber aligning unit includes illuminating and detecting fibers coaxially aligned and displayed from each other at a distance of said narrow gap;

said electronic adaptor includes:

light emitting means optically coupled with said illuminating fiber; photodetecting means optically coupled with said detecting fiber; signal processing means that includes amplification means and a microcontroller;

electrical switching means connected to said microcontroller for switching electrical loads, said fiber optic cable is comprised of fiber optic extensions for said illuminating and detecting fibers with fiber optic connectors for connecting said optical fibers to said switching box and electronic adaptor.

2. The fibre optic apparatus of claim 1, wherein said filtering means is a non-transparent thin strip with an opening allowing light to pass from said illuminating to said detecting fibre.

3. The fibre optic apparatus of claim 1, wherein said filtering means is a neutral density optical filter.

4. The fibre optic apparatus of claim 1, wherein said filtering means is a narrow-band optical filter.

5. The fibre optic apparatus of claim 1, wherein said filtering means is a combination of narrow-band optical filters.

6. The fibre optic apparatus of claim 5, wherein said filtering means is a combination of a sequence of blue, green and yellow narrow-band filters.

7. The fibre optic apparatus of claim 1, wherein said illuminating and detecting fibres are plastic optical fibres.

8. The fibre optic apparatus of claim 1, wherein said actuator is a rotary handle.

9. The fibre optic apparatus of claim 1, wherein said actuator is a slider.

10. The fibre optic apparatus of claim 1, wherein said actuators are buttons.

11. The fibre optic apparatus of claim 1, wherein said signal processing means has auto regulation of the signal level from said photodetecting means.

12. The fibre optic apparatus of claim 1, wherein said signal processing means includes an indicating means displaying the status of said switching box.

13. The fibre optic apparatus of claim 1, wherein said light emitting means are LEDS.

14. The fibre optic apparatus of claim 1, wherein said electronic adapter is located in the PLC.

15. The fibre optic apparatus of claim 1, further comprising a fitting attached to said external housing for connecting said optical cable to said switching box.

* * * * *